No. 701,036. Patented May 27, 1902.
W. S. HARVILLE.
WHEEL RIM.
(Application filed Mar. 7, 1902.)
(No Model.)

Witnesses:
F. L. Ourand.
Frank G. Radelfinger.

Inventor:
Walter S. Harville,
By Laur Bagger & Co.
Attorneys.

UNITED STATES PATENT OFFICE.

WALTER S. HARVILLE, OF MONTAGUE, TEXAS.

WHEEL-RIM.

SPECIFICATION forming part of Letters Patent No. 701,036, dated May 27, 1902.

Application filed March 7, 1902. Serial No. 97,195. (No model.)

*To all whom it may concern:*

Be it known that I, WALTER S. HARVILLE, a citizen of the United States, residing at Montague, in the county of Montague and State of Texas, have invented new and useful Improvements in Wheel-Rims, of which the following is a specification.

My invention relates to improvements in rims; and the object of the same is to construct a rim which will be provided with means for introducing oil thereinto and distributing it throughout the whole periphery thereof in contact with the tire, and thereby keep the tire tight and the rim from checking.

The novel construction used by me in carrying out my invention is fully described in this specification and claimed, and illustrated in the accompanying drawings, forming a part thereof, in which—

Figure 1:
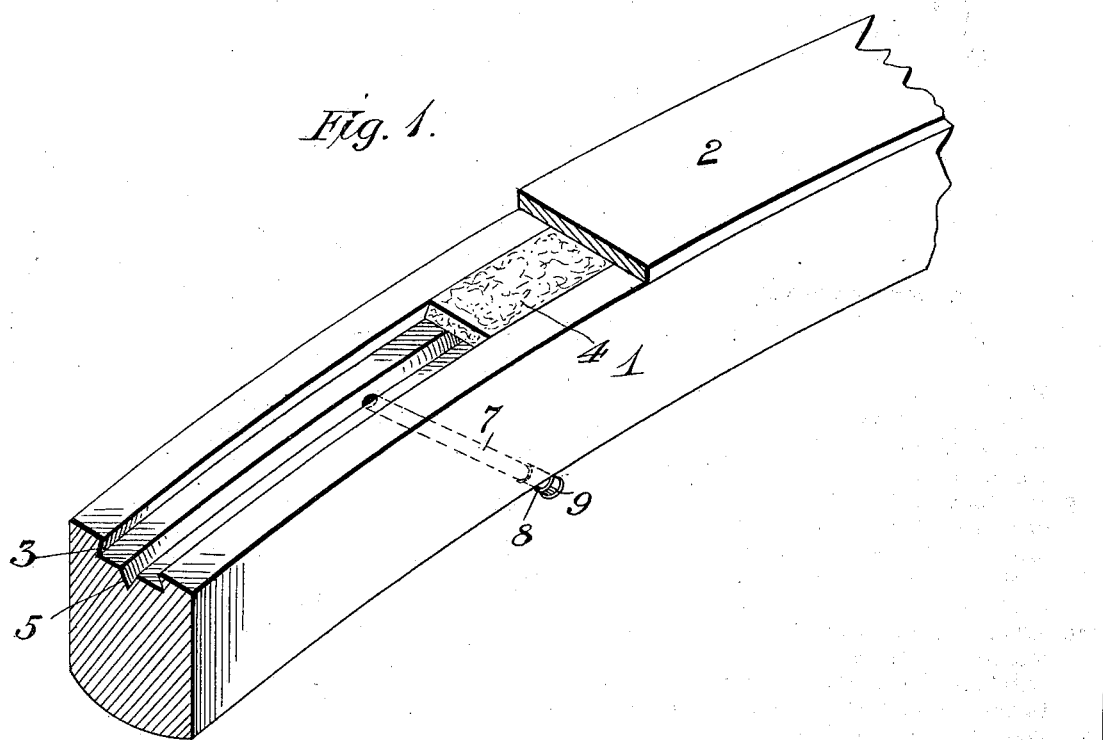
Figure 2:
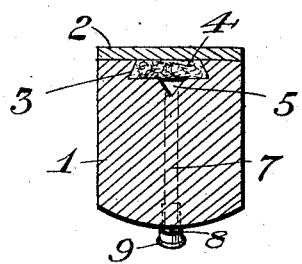

Figure 1 is a perspective view of a fragment of my rim. Fig. 2 is a transverse section of the same.

Like numerals of reference designate like parts in the different views of the drawings. The numeral 1 designates a rim having a tire 2 fitted thereon. A wide dovetailed groove 3 is formed in the periphery of the rim, and mounted in said groove and coming flush with the surface of the face of the rim is a strip 4 of felt or other absorbent material, designed to absorb and retain oil. A small groove 5 is formed in the bottom of the groove 3 and serves as a passage to permit the access of oil to the absorbent strip 4. A diagonal aperture 7 traverses the rim 1 and forms an oil-duct. An oil-cup 8 is screwed into the outer end of the aperture 7 and is provided with a cover 9.

In assembling the wheel the absorbent strip 4 is placed in the groove 3 and the tire 2 set on the rim. The wheel is then turned to bring the cup 8 at the lowest point, when oil is introduced thereinto until the strip 4 is thoroughly saturated along an arc of about ninety degrees. The capillary action of the groove 5 will expedite the process. The ducts 7 are located one in each quadrant, so the whole length of the strip 4 may be saturated. The oil will swell the absorbent strip 4 and tighten the tire and will also thoroughly permeate the body of the rim and keep out water.

I do not wish to be limited as to details of construction, as these may be modified in many particulars without departing from the spirit of my invention.

Having thus described my invention, what I claim as new, and desire to secure by Letters Patent, is—

The combination with a rim having a wide groove in its periphery and a narrow groove in the bottom of said wide groove, which narrow groove is connected to an oil-duct, of an absorbent strip mounted in said groove, substantially as described.

In testimony whereof I have hereunto set my hand in presence of two subscribing witnesses.

WALTER S. HARVILLE.

Witnesses:
W. W. ALCORN,
E. E. SHIPLEY.